United States Patent [19]

Smith et al.

[11] 4,105,984
[45] Aug. 8, 1978

[54] HIGH VOLTAGE DEVICE CONTAINING A FLEXIBLE PREPREG

[75] Inventors: James D. B. Smith, Turtle Creek; Robert N. Kauffman, Monroeville, both of Pa.

[73] Assignee: Westinghouse Electric Corp., Pittsburgh, Pa.

[21] Appl. No.: 663,036

[22] Filed: Mar. 2, 1976

Related U.S. Application Data

[62] Division of Ser. No. 372,719, Jun. 22, 1973, Pat. No. 3,960,803.

[51] Int. Cl.² .................. H01F 27/08; H01F 27/30
[52] U.S. Cl. .................................. 336/60; 336/96; 336/205
[58] Field of Search ............... 336/205, 60; 174/25 C; 428/222, 413

[56] References Cited

U.S. PATENT DOCUMENTS

| | | | |
|---|---|---|---|
| 3,480,471 | 11/1969 | Rembold | 156/330 X |
| 3,617,966 | 11/1971 | Trench et al. | 336/61 |
| 3,657,196 | 4/1972 | Foster | 156/330 X |
| 3,960,803 | 6/1976 | Smith et al. | 428/413 X |

Primary Examiner—Richard D. Lovering
Attorney, Agent, or Firm—D. P. Cillo

[57] ABSTRACT

A flexible, nontacky prepreg for use in bonding high voltage coils and inner cooling channels which comprises a fibrous mat material containing a high molecular weight epoxy and a sterically hindered anhydride. The resin comprises approximately 25 to 500% by weight of the fibrous mat material.

7 Claims, 1 Drawing Figure

U.S. Patent   Aug. 8, 1978   4,105,984
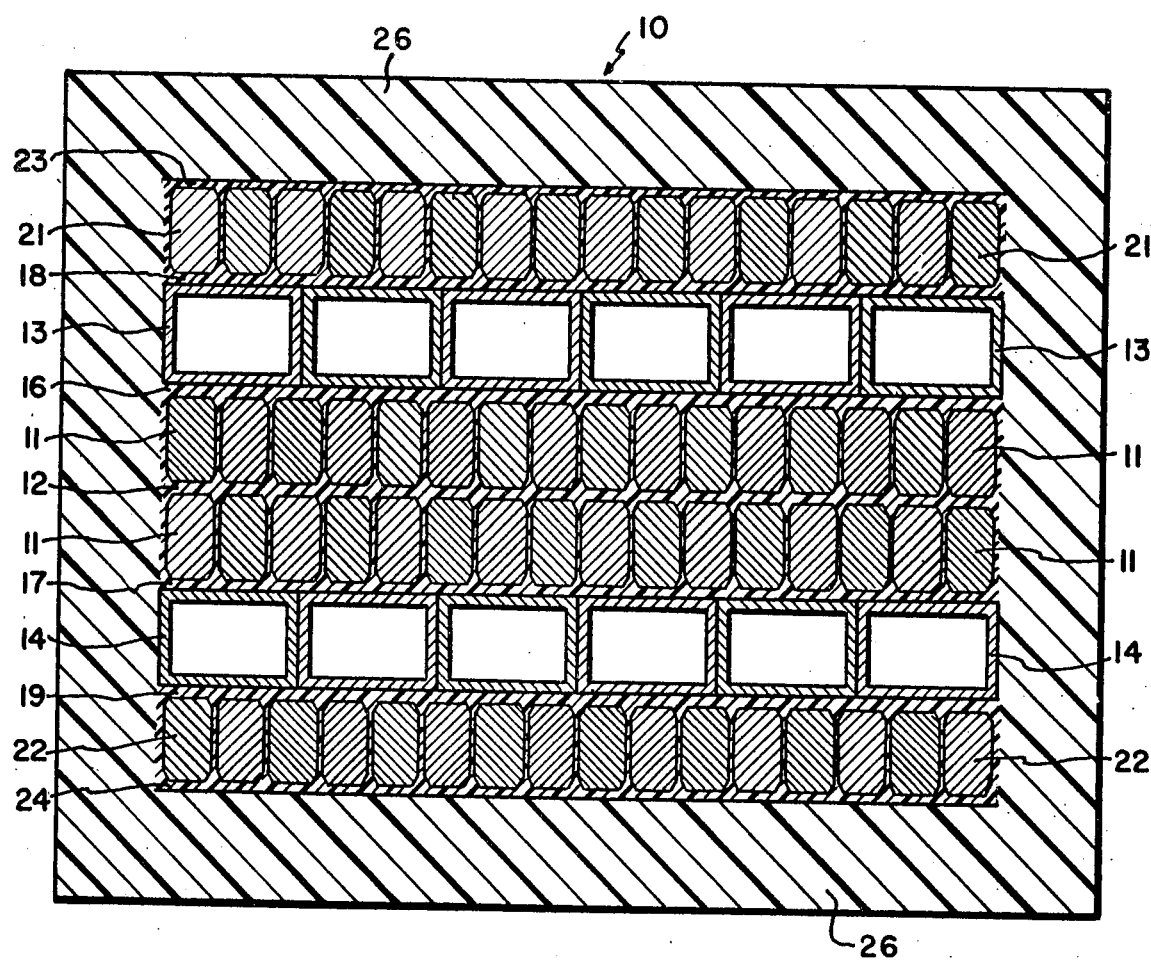

HIGH VOLTAGE DEVICE CONTAINING A FLEXIBLE PREPREG

This is a division of application Ser. No. 372,719 filed June 22, 1973, now U.S. Pat. No. 3,960,803.

FIELD OF THE INVENTION

The present invention relates to an epoxy-anhydride treated prepreg material for use in high voltage coils, and, in particular, to electrical devices incorporating epoxy-anhydride prepregs.

BACKGROUND OF THE INVENTION

Prepreg materials have been used for many years to initially bond inner-cooling channels to high voltage coils prior to the application of a groundwall insulation. Generally, a fibrous mat made of glycol ethylene terephthalate polymeric ester fibers, such as disclosed in U.S. Pat. No. 2,465,319, is treated with a polyester resin. The polyester treated fibrous material is then interpositioned between the inner-cooling channels and coil strips during their assemblage. The assembly is heated to cure the prepreg and sufficiently bond the coils and channels together to permit handling of the assembly during application of an outer insulation. The assembly is then provided with a groundwall insulating cover usually comprising a number of wrapped layers of mica tape.

Because the mica insulation is relatively brittle, the entire assembly is impregnated under pressure with a polyester impregnant which, when cured, provides the required strength and stability as well as a bond between the groundwall and coil strips. Recently, however, a new resinous impregnant was developed in order to improve the hydrolytic stability of the high voltage coils. The new styrene-epoxy-anhydride impregnant, as for example set forth in U.S. Pat. No. 3,657,196, was found to provide not only the desired hydrolytic stability, but also to impart the desired tensile strength to the mica groundwall covering. Moreover, the styrene-epoxy-anhydride impregnant was found to have better solvent resistance than the polyester impregnant and is, therefore, replacing the polyester resins as an impregnant for high voltage devices. During the manufacture of the devices, however, it was discovered that the polyester treated prepreg was incompatible with the new resin resulting in delaminations between the groundwall and the inner coil assembly.

Accordingly, it is an object of the present invention to provide a resin treated fibrous mat prepreg which is not only compatible with styrene-epoxy-anhydride impregnants, but which has a shelf life of at least six months. A further object of the invention is to provide a prepreg which is nontacky and flexible and when cured possesses both good electrical and mechanical properties.

SUMMARY OF THE INVENTION

Generally, the present invention comprises a fibrous mat material such as porous glass mat or glass fiber cloth, asbestos paper or fiber and, preferably, a felt material of glycol ethylene terephthalic polymeric esters, and an epoxy-anhydride resin. The ratio of resin to felt or fibrous mat is from about 0.25:1 to about 5:1, and preferably about 3:4 or 1:1 by weight. A ratio less than 25% by weight of resin to felt does not provide a sufficient amount of resin for adequate coil bonding, and a ratio greater than 400% by weight resin provides more than a sufficient amount for bonding but is not considered economical.

The epoxy-anhydride resin comprises a high molecular weight epoxy resin and a "sterically hindered" anhydride. Any high molecular weight epoxy such as a bisphenol 'A' epoxy, cycloaliphatic epoxies or epoxy novolacs are suitable. It has been found, however, that bisphenol A epoxies are particularly well suited for use in the present invention. The epoxy resin selected for use as a prepreg must have a high molecular weight in order to provide a prepreg which is nontacky. A low molecular weight epoxy, on the other hand, results in a prepreg that is tacky and unsuitable for the desired applications. In particular, the epoxy equivalent weight value must be greater than about 350, and preferably about 360 to 400. Moreover, the epoxy resin should have an initial viscosity of from about $1(10)^6$ to about $6(10)^6$ cps and, preferably about $2-3(10)^6$ cps at 50° C.

The anhydrides suitable for use in the present invention must be relatively unreactive. That is, the anhydrides must be capable of providing a partial cure of the high molecular weight epoxy resins at a temperature of about 80° to 115° C, but which are substantially unreactive with those resins at ambient temperature. Thus, for the purposes of the present description, the anhydrides are referred to as "sterically hindered anhydrides". The cure rates of the anhydrides found suitable for use in the present invention are in contradistinction to polyamides, polyamines and $BF_3$, all of which cure at rates far in excess of that suitable as a prepreg. Hydrophthalic anhydrides such as a combination of 1-methyltetrahydrophthalic anhydride and hexahydrophthalic anhydride has been found to be particularly well suited for use in the present invention. Other anhydrides which are believed to be suitable for use in the present invention either singly or in combination include 1-methylhexahydrophthalic anhydride, 2,5-dimethyltetrahydrophthalic anhydride, NADICmethyl anhydride, tetrahydrophthalic anhydride, and the like.

The prepreg is prepared by cutting the high molecular weight epoxy resin with MEK and toluene, for example, and adding a combination of anhydrides preferably a solid and a liquid anhydride. The mixture is diluted to a solids content range of about 35 to 60% by weight and preferably about 54 to 56% by weight and a viscosity of about 82 seconds at 25° C by Demmler #0 cup, i.e. 75 cps. The fibrous mat material is dipped in the mixture and the solvents are flashed off by placing the treated material in an oven at 135° C for from 2 to 4 minutes. The epoxy-anhydride treated mat prepared in this manner is both flexible and nontacky and has a shelf life of at least six months.

BRIEF DESCRIPTION OF THE DRAWING

Other advantages of the present invention are apparent from a description of presently preferred embodiments taken in connection with the accompanying drawing which is a sectional elevation of a fully assembled and cured inner-cooled high voltage coil.

PREFERRED EMBODIMENTS

Referring to the drawing, one type of high voltage electrical device wherein prepregs are required for assembly is shown in which an inner-cooled high voltage coil 10 comprises first rows 11 of preferably copper coil strips. Usually, each of the individual coil strips is coated with a sizing of glass fibers prior to being used in the assembly, and, in certain applications, includes an additional coating of insulating varnish or the like. Positioned between first coil rows 11 is a first layer of prepreg 12 comprising a fibrous mat made of glycol ethylene terephthalate polymeric ester fibers treated with the epoxy-anhydride resin of the present invention. A pair of inner-cooling channels 13 and 14 are positioned adjacent first rows 11 of coil strips with second layers 16 and 17 of epoxy-anhydride fibrous mat prepreg positioned therebetween. Third prepreg layers 18 and 19 are positioned adjacent inner-cooling channels 13 and 14 upon which are positioned second coil strips 21 and 22. Adjacent each set of second coil strips 21 and 22 are positioned fourth prepreg layers 23 and 24. This assembled array of coils, channels, and prepreg layers are placed in a bonding furnace for from 45 minutes to about 4 hours and heated between about 135° C and 115° C to provide an integrally bonded partially cured assembly, see TABLE I below: HEATING CYCLE. The fibrous mat is utilized principally as a carrier of prepreg resin. When the assembly is placed under pressure, some of the prepreg resin is squeezed between the individual coil strips and serves as an extra insulation between the individual coil strips.

The assembly thusly bonded is capable of being handled without relative movement of the component parts. A mica groundwall covering 26 is thereafter wrapped around the assembled unit to provide the required insulation and protection to the coils. The wrapped assembly is then impregnated under pressure with a styrene-epoxy-anhydride impregnant and heated to a temperature of about 160° C from about 6 to 16 hours; see TABLE I: POST CURE CYCLE. The fully cured system provides an integrally bonded inner-cooled high voltage coil 10 in which the impregnant is bonded to at least a portion of the prepreg. In particular, no delamination was found to exist between groundwall 26 and fourth prepreg layers 23 and 24 as well as along the side walls where uncured prepreg resin is forced during impregnation.

The following are nonlimiting examples of presently preferred epoxy-anhydride resins used in the prepregs to fabricate coils 10 and other types of high voltage devices.

EXAMPLE 1

55 parts of a high molecular weight bisphenol 'A' epoxy sold as Epirez 5162 epoxy resin manufactured by Celanese having an epoxy equivalent weight value of 360–400, a viscosity of $2-3(10)^6$ cps at 50° C, and a melting point of from 45°–55° C, was heated and cut with 45 parts of a 1:1 blend of MEK and toluene at 70° C. To this solution were added 12.1 parts of liquid 1-methyltetrahydrophthalic anhydride and 12.1 parts of solid hexahydrophthalic anhydride. The solution was permitted to cool and additional quantities of 1:1 MEK/toluene was added to adjust the solids content to between 54–56% by weight and a viscosity of about 82 seconds at 25° C as measured by a Demmler #0 cup; 75 cps.

EXAMPLE 2

Example 1 was repeated wherein 100 parts of bisphenol 'A' epoxy, 24 parts liquid 1-methyltetrahydrophthalic anhydride and 20 parts of solid hexahydrophthalic anhydride were utilized.

EXAMPLE 3

Example 1 was repeated utilizing 100 parts of bisphenol 'A' epoxy, 27 parts of liquid 1-methyltetrahydrophthalic anhydride and 17 parts solid hexahydrophthalic anhydride.

EXAMPLE 4

Example 1 was repeated utilizing 100 parts bisphenol 'A' epoxy, 22 parts liquid 1-methyltetrahydrophthalic anhydride, 22 parts solid hexahydrophthalic anhydride and 0.15 methyltrioctylphoshonium-dimethylphosphate accelerator. Example 4, therefore, was the same as Example 1 except for the addition of cure accelerating agent.

In Examples 1–4, other nonhalide phosphonium salts can be utilized as an accelerator. Other such nonhalide phosphonium salt accelerators include, for example, methyltributyl phosphonium-dimethylphosphate and tetrabutyl phosphonium acetate. The accelerators are preferably added in amounts of 0.15 parts by weight to 100 parts epoxy resin.

The resins prepared in Examples 1–4 were used to prepare the prepregs of the present invention by treating small pieces of fibrous mat or felt made from fibrous glycol ethylene terephthalate polymeric esters. The solvents were "flashed off" by placing the treated felt material in an oven heated to about 135° C for about 2–4 minutes. The finished epoxy-anhydride treated mat prepregs were flexible and nontacky and had a resin to fibrous mat ratio of between 75 to 125% by weight.

The following table sets forth the relative bonding strengths of the prepregs of the present invention. The prepregs prepared with the resins set forth in Examples 1 and 2 were cut into approximately 1 inch squares and placed in an aluminum dish. Each prepreg was subjected to a heating cycle to simulate the bonding cycle of the coils and cooling channels. A small amount, approximately 10 grams of styrene-epoxy-anhydride impregnant was then poured over the cooled sample to simulate the impregnation process of the mica groundwall. The samples were then heated to 135° C to gel the impregnant and baked at 160° C for about 16 hours to fully cure the system. The bonding strength was determined qualitatively by attempting to delaminate the felt impregnant interface. If no delamination occurred, the bonding was rated as excellent.

TABLE I

| FELT PREPREG RESIN COMPOSITION RATIO RESIN: FELT 3:4 | HEATING CYCLE (PRE-GROUNDWALL BOND) | POST CURE CYCLE AFTER IMPREGNATION WITH STYRENE-EPOXY-ANHYDRIDE IMPREGNANT* | BONDING SGRENGTH BETWEEN FELT PREPREG AND IMPREGNANT |
|---|---|---|---|
| POLYESTER PREPREG | 45 minutes at 135° C | 16 hours at 160° C | No bonding |
| EXAMPLE 1 | 45 minutes at 135° C | 16 hours at 160° C | Excellent bonding |
| EXAMPLE 2 | 2 hours at 80° C<br>2 hours at 100° C<br>45 minutes at 135° C | 16 hours at 160° C | Excellent bonding |
| EXAMPLE 1 | 4 hours at 115° C | 16 hours at 160° C | Good bonding |
| EXAMPLE 1 | 16 hours at 160° C | 16 hours at 160° C | Fair - good bonding |

*The styrene-epoxy-anhydride impregnant was gelled at 135° C for one hour prior to the post-curing cycle.

From Table I it should be noted that the prior art polyester prepreg provided no bond with the styrene-epoxy-anhydride impregnant, even with a very short Heating Cycle. For the prepregs of the present invention, the preferred Heating Cycle to impart the necessary handling strength to the coil assembly is about 4 hours at 115°–120° C or 2 hours at 125°–130° C.

The gel time for prepregs such as Example 1 decreases very rapidly with temperature increases. For example, the prepreg of Example 1 is very close to its gel point at 125° C after 2 hours or 115° C after 4 hours. It has been found that going past the gel point prior to impregnation tends to decrease the bond strength at the interface. Thus, the heating cycle for bonding the coils and channels prior to application of the mica groundwall should be insufficient to gel the resin in order to obtain good interface bonding.

For high voltage usage, it is necessary that the power factors be below 10% at 150° C, otherwise the prepreg is considered unacceptable. Thus, electrical property measurements were made on a ⅛ inch casting of Example 4 prepreg. The (60 Hz) power factor and dielectric constant values were found to be

|  | 125° C | 150° C |
|---|---|---|
| 100 × tan δ | 0.84 | 5.72 |
| ε | 3.6 | 5.1 |

In Examples 1–4, the amount of liquid anhydride, 1-methyltetrahydrophthalic anhydride and solid anhydride, hexahydrophthalic anhydride were found to be critical in that an excess of liquid anhydride made the prepreg tacky and flow at ambient temperature whereas an excess of solid anhydride caused the prepreg to become stiff and inflexible as well as to shorten the shelf life. Accordingly, for the anhydrides of Examples 1–4, the preferred ranges based upon 100 parts bisphenol A high molecular weight epoxy are 1-methyltetrahydrophthalic liquid anhydride: 18–29 parts by wt.
hexahydrophthalic solid anhydride: 15–25 parts by wt.

Therefore, other relatively unreactive anhydrides can be used to achieve the same desired characteristics as well as other high molecular weight epoxies.

While presently preferred embodiments of the invention have been particularly described, it may otherwise be embodied within the scope of the appended claims.

What is claimed is:

1. A high voltage electrical device comprising a plurality of high voltage coil strips having a groundwall insulation therearound, said coils having adjacent thereto and being bonded together by at least one prepreg comprising a fibrous mat containing an ungelled prepreg resin comprising epoxy resin having an epoxy equivalent weight greater than about 350 and at least one sterically hindered anhydride, and said groundwall having impregnated therethrough a styrene-epoxy-anhydride impregnating resin, the groundwall contacting at least a portion of said prepreg, said prepreg resin comprising from 25 wt.% to 500 wt.% of the prepreg and being compatible with the impregnating resin, so that the prepreg resin and the impregnating resin can be finally cured to integrally bond the prepreg and the groundwall together without delamination.

2. A high voltage device as set forth in claim 1 comprising at least two rows of coil strips having said prepreg positioned therebetween.

3. A device as set forth in claim 1, wherein said epoxy prepreg resin has an epoxy equivalent weight of between 360 to 400, a power factor of below 10% at 150° C after curing, contains 18 to 29 parts liquid anhydride and 15 to 25 parts solid anhydride per 100 parts of epoxy resin, and also includes a nonhalide phosphonium salt accelerating agent.

4. A high voltage electrical device comprising a plurality of high voltage coil strips and inner-cooling channels having a groundwall insulation therearound, said coils and channels having adjacent thereto and being bonded together by at least one prepreg comprising a fibrous mat material containing an ungelled prepreg resin consisting essentially of epoxy resin having an epoxy equivalent weight greater than about 350 and at least one sterically hindered anhydride which is substantially unreactive with the epoxy resin at ambient temperatures, and said groundwall having impregnated therethrough a styrene-epoxy-anhydride impregnating resin, the groundwall contacting at least a portion of said prepreg, said prepreg resin comprising from 25 wt.% to 500 wt.% of the prepreg and being compatible with the impregnating resin, so that the prepreg resin and the impregnating resin can be finally cured to integrally bond the prepreg and the groundwall together without delamination.

5. A device as set forth in claim 4, wherein said prepreg epoxy resin has an epoxy equivalent weight value of between 360 to 400, a power factor of below 10% at 150° C after curing, contains 18 to 29 parts liquid anhydride and 15 to 25 parts solid anhydride per 100 parts of epoxy resin, and said device comprises at least two rows of coil strips having said prepreg positioned therebetween.

6. A device as set forth in claim 4 wherein said prepreg resin is prepared from 100 parts by weight bisphenol A epoxy, 18–29 parts by weight 1-methyltetrahydrophthalic anhydride and 15–25 parts by weight hexahydrophthalic anhydride.

7. A device as set forth in claim 6 wherein said resin includes a nonhalide phosphonium salt accelerating agent.

* * * * *